United States Patent
Ji et al.

(10) Patent No.: US 10,344,832 B2
(45) Date of Patent: Jul. 9, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Seongwook Ji, Gunpo-si (KR); Ki Tae Kim, Incheon (KR); Juhyeon Park, Suwon-si (KR); Hyun Sik Kwon, Seoul (KR); Ilhan Yoo, Seongnam-si (KR); Seong Wook Hwang, Gunpo-si (KR); Wonmin Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 15/814,135

(22) Filed: Nov. 15, 2017

(65) Prior Publication Data
US 2019/0120331 A1 Apr. 25, 2019

(30) Foreign Application Priority Data
Oct. 19, 2017 (KR) .......................... 10-2017-0135816

(51) Int. Cl.
*F16H 3/66* (2006.01)
(52) U.S. Cl.
CPC ....... *F16H 3/66* (2013.01); *F16H 2200/0069* (2013.01); *F16H 2200/201* (2013.01); *F16H 2200/2046* (2013.01); *F16H 2200/2097* (2013.01)

(58) Field of Classification Search
CPC ............... F16H 3/66; F16H 2200/0069; F16H 2200/201; F16H 2200/2046; F16H 2200/2097
See application file for complete search history.

(56) References Cited

U.S. PATENT DOCUMENTS

| | | | | |
|---|---|---|---|---|
| 6,669,595 B1* | 12/2003 | Raghavan | ................. | F16H 3/66 475/275 |
| 6,736,750 B1* | 5/2004 | Lee | ........................... | F16H 3/66 475/276 |
| 6,746,360 B2* | 6/2004 | Bucknor | ................... | F16H 3/66 475/275 |
| 7,128,684 B2* | 10/2006 | Raghavan | ................. | F16H 3/66 475/296 |
| 2004/0053733 A1* | 3/2004 | Bucknor | ................... | F16H 3/66 475/276 |

(Continued)

*Primary Examiner* — David R Morris
(74) *Attorney, Agent, or Firm* — Morgan, Lewis & Bockius LLP

(57) ABSTRACT

A planetary gear train may include input and output shafts, first to third planetary gear sets respectively having first to third, fourth to sixth, and seventh to ninth elements, a first shaft connected to the first element, and selectively connectable to the input shaft, a second shaft connected to the fifth element, and selectively connectable to the input shaft, a third shaft connected to the eighth element and the output shaft, a fourth shaft connected to the second element and the fourth element, a fifth shaft connected to the third and seventh elements, a sixth shaft connected to the sixth element and the transmission housing, and a seventh shaft connected to the ninth element and selectively connectable to the transmission housing.

7 Claims, 2 Drawing Sheets

(56) References Cited

U.S. PATENT DOCUMENTS

| | | | |
|---|---|---|---|
| 2004/0087409 A1* | 5/2004 | Lee .......................... | F16H 3/66 475/269 |
| 2006/0094561 A1* | 5/2006 | Raghavan ................. | F16H 3/66 475/296 |
| 2017/0108090 A1* | 4/2017 | Ji ............................. | F16H 3/66 |

* cited by examiner

FIG. 2

| Shift-stage | Engagement element | | | | | | Gear ratio |
|---|---|---|---|---|---|---|---|
| | C1 | C2 | C3 | C4 | C5 | B1 | |
| D1 | ● | | ● | | ● | | 5.800 |
| D2 | ● | | | ● | | ● | 3.100 |
| D3 | ● | | ● | ● | | | 2.600 |
| D4 | ● | | | ● | ● | | 1.715 |
| D5 | ● | | ● | | | ● | 1.600 |
| D6 | | ● | | ● | | ● | 1.192 |
| D7 | | ● | ● | | | ● | 1.000 |
| D8 | ● | ● | | | | ● | 0.912 |
| D9 | | ● | | ● | ● | | 0.660 |
| D10 | ● | ● | | | ● | | 0.564 |
| REV | ● | | | | ● | ● | -6.200 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0135816 filed on Oct. 19, 2017, the entire contents of which is incorporated herein for all purposes by this reference.

BACKGROUND OF THE INVENTION

Field of the Invention

The present invention relates to an automatic transmission for a vehicle.

Description of Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In this respect, an eight-speed automatic transmission has been recently introduced, and a planetary gear train for an automatic transmission facilitating more shift stages is under investigation.

An automatic transmission of eight or more shift-stages typically may include three to four planetary gear sets and five to seven engagement elements (frictional elements), and may easily become lengthy, deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least ten forward speeds, providing better performance and fuel efficiency of a vehicle.

A planetary gear train according to an exemplary embodiment of the present invention may include an input shaft receiving an engine torque, an output shaft outputting a shifted torque, a first planetary gear set having first, second and third rotation elements, a second planetary gear set having fourth, fifth, and sixth rotation elements, a third planetary gear set having seventh, eighth, and ninth rotation elements, An exemplary planetary gear set may further include a first shaft fixedly connected to the first rotation element, and selectively connectable to the input shaft, a second shaft fixedly connected to the fifth rotation element, and selectively connectable to the input shaft, a third shaft fixedly connected to the eighth rotation element, and fixedly connected to the output shaft, a fourth shaft fixedly connected to the second rotation element and the fourth rotation element, a fifth shaft fixedly connected to the third rotation element and the seventh rotation element, a sixth shaft fixedly connected to the sixth rotation element and fixedly connected to the transmission housing, and a seventh shaft fixedly connected to the ninth rotation element and selectively connectable to the transmission housing.

The input shaft and the first shaft, the input shaft and the second shaft, the second shaft and the third shaft, the first shaft and the fourth shaft, and the second shaft and the seventh shaft may be selectively interconnected to each other respectively.

The exemplary planetary gear train may further include five clutches each selectively connecting a corresponding pair among the input shaft, the output shaft, and the first to seventh shafts, and one brake selectively connecting the seventh shaft to the transmission housing.

The five clutches may include a first clutch disposed between the input shaft and the first shaft, a second clutch disposed between the input shaft and the second shaft, a third clutch disposed between the second shaft and the third shaft, a fourth clutch disposed between the first shaft and the fourth shaft, and a fifth clutch disposed between the second shaft and the seventh shaft, The one brake may be a first brake disposed between the seventh shaft and the transmission housing.

The first planetary gear set may be a single pinion planetary gear set having a first sun gear, a first planet carrier, and a first ring gear as the first, second and third rotation elements. The second planetary gear set may be a single pinion planetary gear set having a second sun gear, a second planet carrier, and a second ring gear as the fourth, fifth, and sixth rotation elements. The third planetary gear set may be a single pinion planetary gear set having a third sun gear, a third planet carrier, and a third ring gear as the seventh, eighth, and ninth rotation elements.

A planetary gear train according to an exemplary embodiment of the present invention may realize at least ten forward speeds and one reverse speed by combination of three planetary gear sets of simple planetary gear sets together with six engagement elements.

Furthermore, a planetary gear train according to an exemplary embodiment of the present invention may improve driving stability by realizing shift-stages appropriate for rotation speed of an engine due to multi-stages of an automatic transmission.

Furthermore, a planetary gear train according to an exemplary embodiment of the present invention may maximize engine driving efficiency by multi-stages of an automatic transmission, and may improve power delivery performance and fuel consumption.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages applicable to a planetary gear train according to an exemplary embodiment of the present invention.

Figure 1:
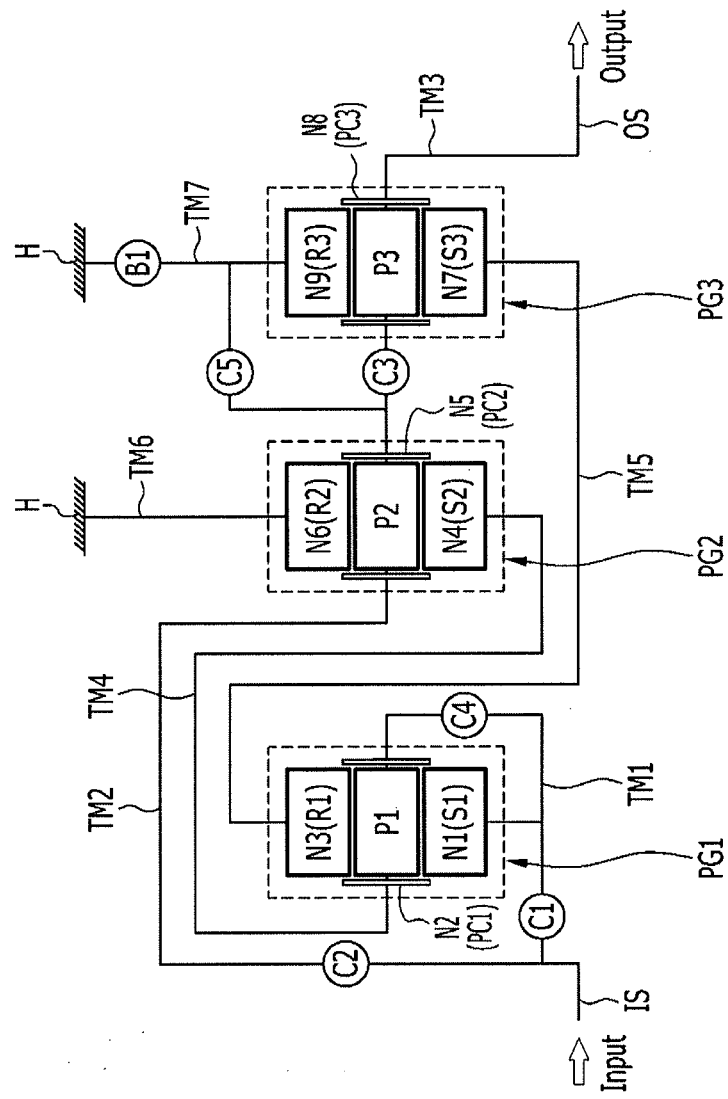
FIG. 1 is a schematic diagram of a planetary gear train according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention may include first, second and third planetary gear sets PG1, PG2, and PG3 disposed on a same axis, an input shaft IS, an output shaft OS, seven shafts TM1 to TM7 interconnecting rotation elements of the first, second and third planetary gear sets PG1, PG2, and PG3, engagement elements of five clutches C1 to C5 and one brake B1, and a transmission housing H.

Torque input from the input shaft IS is shifted by cooperative operation of the first, second and third planetary gear sets PG1, PG2, and PG3, and then output through the output shaft OS.

The planetary gear sets are disposed in the order of the first, second and third planetary gear sets PG1, PG2, and PG3, from an engine side.

The input shaft IS is an input member and may receive a torque from a crankshaft of an engine through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and may include a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1 engaged with the first sun gear S1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and may include a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2 engaged with the second sun gear S2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and may include a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3 engaged with the third sun gear S3. The third sun gear S3 acts as a seventh rotation element N7, the third planet carrier PC3 acts as an eighth rotation element N8, and the third ring gear R3 acts as a ninth rotation element N9.

In the first, second and third planetary gear sets PG1, PG2, and PG3, the second rotation element N2 is fixedly connected to the fourth rotation element N4, the third rotation element N3 is fixedly connected to the seventh rotation element N7, and seven shafts TM1 to TM7 are formed.

The seven shafts TM1 to TM7 are hereinafter described more specifically.

The first shaft TM1 is fixedly connected to the first rotation element N1 (first sun gear S1), and selectively connectable to the input shaft IS selectively acting as an input element.

The second shaft TM2 is fixedly connected to the fifth rotation element N5 (second planet carrier PC2), and selectively connectable to the input shaft IS selectively acting as an input element.

The third shaft TM3 is fixedly connected to the eighth rotation element N8 (third planet carrier PC3), and fixedly connected to the output shaft OS always acting as an output element.

The fourth shaft TM4 is fixedly connected to second rotation element N2 (first planet carrier PC1) and fourth rotation element N4 (second sun gear S2).

The fifth shaft TM5 is fixedly connected to third rotation element N3 (first ring gear R1) and seventh rotation element N7 (third sun gear S3).

The sixth shaft TM6 is fixedly connected to the sixth rotation element N6 (second ring gear R2), and fixedly connected to the transmission housing H, always acting as a fixed element.

The seventh shaft TM7 is fixedly connected to the ninth rotation element N9 (third ring gear R3).

Each of the seven shafts TM1 to TM7 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotates separately when the engagement element is not engaged, and rotates at a same speed when the engagement element is engaged. It may be understood that in the case that a member is "selectively connectable" with a transmission housing by an engagement element, the member may be stationary when the engagement element is engaged.

The input shaft IS is selectively connectable to the first shaft TM1 and the second shaft TM2 respectively, the second shaft TM2 is selectively connectable to the third shaft TM3, the first shaft TM1 is selectively connectable to the fourth shaft TM4, and the second shaft TM2 is selectively connectable to the seventh shaft TM7.

The seventh shaft TM7 is selectively connectable to the transmission housing H, selectively acting as a fixed element.

The engagement elements of five clutches C1, C2, C3, C4, and C5 are disposed between the seven shafts TM1 to TM7, the input shaft IS, and the output shaft OS, to form selective connections.

The seven shafts TM1 to TM7 may be selectively connectable to the transmission housing H, by control elements of one brake B1.

The seven engagement elements of the five clutches C1 to C5 and the one brake B1 are disposed as follows.

The first clutch C1 is disposed between the input shaft IS and the first shaft TM1, and selectively connects the input shaft IS and the first shaft TM1, controlling power delivery therebetween.

The second clutch C2 is disposed between the input shaft IS and the second shaft TM2, and selectively connects the input shaft IS and the second shaft TM2, controlling power delivery therebetween.

The third clutch C3 is disposed between the second shaft TM2 and the third shaft TM3, and selectively connects the second shaft TM2 and the third shaft TM3, controlling power delivery therebetween.

The fourth clutch C4 is disposed between the first shaft TM1 and the fourth shaft TM4, and selectively connects the first shaft TM1 and the fourth shaft TM4, controlling power delivery therebetween.

The fifth clutch C5 is disposed between the second shaft TM2 and the seventh shaft TM7, and selectively connects the second shaft TM2 and the seventh shaft TM7, controlling power delivery therebetween.

The first brake B1 is disposed between the seventh shaft TM7 and the transmission housing H, and selectively connects the seventh shaft TM7 to the transmission housing H.

The engagement elements of the first, second, third, fourth, and fifth clutches C1, C2, C3, C4, and C5 and the first brake B1 may be realized as multi-plate hydraulic pressure friction devices that are frictionally engaged by hydraulic pressure, however, it may not be understood to be limited thereto, since various other configuration that are electrically controllable may be available.

FIG. 2 is an operational chart for respective control elements at respective shift-stages applicable to a planetary gear train according to an exemplary embodiment of the present invention.

Referring to FIG. 2, a planetary gear train according to an exemplary embodiment of the present invention realizes shifting between ten forward speeds and one reverse speed by operating three elements among the engagement elements of the first, second, third, fourth, and fifth clutch (C1, C2, C3, C4, C5) and the first brake B1.

In the first forward speed D1, the first, third, and fifth clutches C1, C3, and C5 are simultaneously operated.

As a result, the input shaft IS and the first shaft TM1 are connected by the operation of the first clutch C1, the second shaft TM2 and the third shaft TM3 are connected by the operation of the third clutch C3, and the second shaft TM2 and the seventh shaft TM7 are connected by the operation of the fifth clutch C5. In the present state, a torque is input to the first shaft TM1.

In the above state, the sixth shaft TM6 always acts as a fixed element, realizing the first forward speed and outputting a shifted torque through the output shaft OS connected to the third shaft TM3.

In the second forward speed D2, the first and fourth clutches C1 and C4 and the first brake B1 are simultaneously operated.

As a result, the input shaft IS and the first shaft TM1 are connected by the operation of the first clutch C1, and the first shaft TM1 and the fourth shaft TM4 are connected by the operation of the fourth clutch C4. In the present state, a torque is input to the first shaft TM1.

In the above state, the sixth shaft TM6 always acts as a fixed element, and the seventh shaft TM7 acts as a fixed element by the operation of the first brake B1, realizing the second forward speed and outputting a shifted torque to the output shaft OS connected to the third shaft TM3.

In the third forward speed D3, the first, third, and fourth clutches C1, C3, and C4 are simultaneously operated.

As a result, the input shaft IS and the first shaft TM1 are connected by the operation of the first clutch C1, the second shaft TM2 and the third shaft TM3 are connected by the operation of the third clutch C3, and the first shaft TM1 and the fourth shaft TM4 are connected by the operation of the fourth clutch C4. In the present state, a torque is input to the first shaft TM1.

In the above state, the sixth shaft TM6 always acts as a fixed element, realizing the third forward speed and outputting a shifted torque through the output shaft OS connected to the third shaft TM3.

In the fourth forward speed D4, the first, fourth, and fifth clutch C1, C4, and C5 are simultaneously operated.

As a result, the input shaft IS and the first shaft TM1 are connected by the operation of the first clutch C1, the first shaft TM1 and the fourth shaft TM4 are connected by the operation of the fourth clutch C4, and the second shaft TM2 and the seventh shaft TM7 are connected by the operation of the fifth clutch C5. In the present state, a torque is input to the first shaft TM1.

In the above state, the sixth shaft TM6 always acts as a fixed element, realizing the fourth forward speed and outputting a shifted torque through the output shaft OS connected to the third shaft TM3.

In the fifth forward speed D5, the first and third clutches C1 and C3 and the first brake B1 are simultaneously operated.

As a result, the input shaft IS and the first shaft TM1 are connected by the operation of the first clutch C1, and the second shaft TM2 and the third shaft TM3 are connected by the operation of the third clutch C3. In the present state, a torque is input to the first shaft TM1.

In the above state, the sixth shaft TM6 always acts as a fixed element, and the seventh shaft TM7 acts as a fixed element by the operation of the first brake B1, realizing the fifth forward speed and outputting a shifted torque to the output shaft OS connected to the third shaft TM3.

In the sixth forward speed D6, the second and fourth clutches C2 and C4 and the first brake B1 are simultaneously operated.

As a result, the input shaft IS and the second shaft TM2 are connected by the operation of the second clutch C2, and the first shaft TM1 and the fourth shaft TM4 are connected by the operation of the fourth clutch C4. In the present state, a torque is input to the second shaft TM2.

In the above state, the sixth shaft TM6 always acts as a fixed element, and the seventh shaft TM7 acts as a fixed element by the operation of the first brake B1, realizing the sixth forward speed and outputting a shifted torque to the output shaft OS connected to the third shaft TM3.

In the seventh forward speed D7, the second and third clutches C2 and C3 and the first brake B1 are simultaneously operated.

As a result, the input shaft IS and the second shaft TM2 are connected by the operation of the second clutch C2, and the second shaft TM2 and the third shaft TM3 are connected by the operation of the third clutch C3. In the present state, a torque is input to the second shaft TM2.

In the above state, the sixth shaft TM6 always acts as a fixed element, the seventh shaft TM7 acts as a fixed element by the operation of the first brake B1, a torque input through the second shaft TM2 is transmitted to the third shaft TM3 connected to the output shaft OS without a change, and thus the same torque as inputted is output through the output shaft OS in the seventh forward speed.

In the eighth forward speed D8, the first and second clutch C1 and C2 and the first brake B1 are simultaneously operated.

As a result, the input shaft IS and the first shaft TM1 are connected by the operation of the first clutch C1, and the input shaft IS and the second shaft TM2 are connected by the operation of the second clutch C2. In the present state, a torque is input to the first shaft TM1 and the second shaft TM2.

In the above state, the sixth shaft TM6 always acts as a fixed element, and the seventh shaft TM7 acts as a fixed element by the operation of the first brake B1, realizing the eighth forward speed and outputting a shifted torque to the output shaft OS connected to the third shaft TM3.

In the ninth forward speed D9, the second, fourth, and fifth clutches (C2, C4, 5) are simultaneously operated.

As a result, the input shaft IS and the second shaft TM2 are connected by the operation of the second clutch C2, the first shaft TM1 and the fourth shaft TM4 are connected by the operation of the fourth clutch C4, and the second shaft TM2 and the seventh shaft TM7 are connected by the operation of the fifth clutch C5. In the present state, a torque is input to the second shaft TM2.

In the above state, the sixth shaft TM6 always acts as a fixed element, realizing the ninth forward speed and outputting a shifted torque through the output shaft OS connected to the third shaft TM3.

In the tenth forward speed D10, the first, second, and fifth clutches C1, C2, and C5 are simultaneously operated.

As a result, the input shaft IS and the first shaft TM1 are connected by the operation of the first clutch C1, the input shaft IS and the second shaft TM2 are connected by the operation of the second clutch C2, and the second shaft TM2 and the seventh shaft TM7 are connected by the operation of the fifth clutch C5. In the present state, a torque is input to the first shaft TM1 and the second shaft TM2.

In the above state, the sixth shaft TM6 always acts as a fixed element, realizing the tenth forward speed and outputting a shifted torque through the output shaft OS connected to the third shaft TM3.

In the reverse speed REV, the first and fifth clutch C1 and C5 and the first brake B1 are simultaneously operated.

As a result, the input shaft IS and the first shaft TM1 are connected by the operation of the first clutch C1, and the second shaft TM2 and the seventh shaft TM7 are connected by the operation of the fifth clutch C5. In the present state, a torque is input to the first shaft TM1.

In the above state, the sixth shaft TM6 always acts as a fixed element, and the seventh shaft TM7 acts as a fixed element by the operation of the first brake B1, realizing the reverse speed and outputting a reverse torque through the output shaft OS connected to the third shaft TM3.

As described above, a planetary gear train according to an exemplary embodiment of the present invention may realize ten forward speeds and one reverse speed by operating the three planetary gear sets PG1, PG2, and PG3 by controlling the five clutches C1, C2, C3, C4, and C5 and the one brake B1.

Furthermore, a planetary gear train according to an exemplary embodiment of the present invention may substantially improve driving stability by realizing shift-stages appropriate for rotation speed of an engine due to multi-stages of an automatic transmission.

Furthermore, a planetary gear train according to an exemplary embodiment of the present invention may maximize engine driving efficiency by multi-stages of an automatic transmission, and may improve power delivery performance and fuel consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present inven-

What is claimed is:

1. A planetary gear train apparatus of an automatic transmission for a vehicle, comprising:
   an input shaft receiving an engine torque;
   an output shaft outputting a shifted torque;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a first shaft fixedly connected to the first rotation element, and selectively connectable to the input shaft;
   a second shaft fixedly connected to the fifth rotation element, and selectively connectable to the input shaft;
   a third shaft fixedly connected to the eighth rotation element, and fixedly connected to the output shaft;
   a fourth shaft fixedly connected to the second rotation element and the fourth rotation element;
   a fifth shaft fixedly connected to the third rotation element and the seventh rotation element;
   a sixth shaft fixedly connected to the sixth rotation element and fixedly connected to a transmission housing; and
   a seventh shaft fixedly connected to the ninth rotation element and selectively connectable to the transmission housing; wherein
   the first planetary gear set is a single pinion planetary gear set having a first sun gear, a first planet carrier, and a first ring gear as the first rotation element, the second rotation element, and the third rotation element, respectively,
   the second planetary gear set is a single pinion planetary gear set having a second sun gear, a second planet carrier, and a second ring gear as the fourth rotation element, the fifth rotation element, and the sixth rotation element, respectively,
   the third planetary gear set is a single pinion planetary gear set having a third sun gear, a third planet carrier, and a third ring gear as the seventh rotation element, the eighth rotation element, and the ninth rotation element, respectively.

2. The planetary gear train apparatus of claim 1, wherein the input shaft is selectively connectable to the first shaft, the input shaft is selectively connectable to the second shaft, the second shaft is selectively connectable to the third shaft, the first shaft is selectively connectable to the fourth shaft, and the second shaft is selectively connectable to the seventh shaft.

3. The planetary gear train apparatus of claim 2, further including:
   five clutches each selectively connecting a corresponding pair among the input shaft, the output shaft, and the first to seventh shafts; and
   a brake selectively connecting the seventh shaft to the transmission housing.

4. The planetary gear train apparatus of claim 3,
   wherein the five clutches comprise:
   a first clutch mounted between the input shaft and the first shaft;
   a second clutch mounted between the input shaft and the second shaft;
   a third clutch mounted between the second shaft and the third shaft;
   a fourth clutch mounted between the first shaft and the fourth shaft; and
   a fifth clutch mounted between the second shaft and the seventh shaft,
   wherein the brake is mounted between the seventh shaft and the transmission housing.

5. A planetary gear train apparatus of an automatic transmission for a vehicle, comprising:
   an input shaft receiving an engine torque;
   an output shaft outputting a shifted torque;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element,
   wherein the first rotation element is selectively connectable to the input shaft,
   the second rotation element is fixedly connected to the fourth rotation element, and selectively connectable to the first rotation element,
   the third rotation element is fixedly connected to the seventh rotation element,
   the fifth rotation element is selectively connectable to the input shaft,
   the sixth rotation element is fixedly connected to a transmission housing,
   the eighth rotation element is selectively connectable to the fifth rotation element, and fixedly connected to the output shaft, and
   the ninth rotation element selectively connectable to the fifth rotation element and the transmission housing respectively; wherein
   the first planetary gear set is a single pinion planetary gear set having a first sun gear, a first planet carrier, and a first ring gear as the first rotation element, the second rotation element, and the third rotation element, respectively,
   the second planetary gear set is a single pinion planetary gear set having a second sun gear, a second planet carrier, and a second ring gear as the fourth rotation element, the fifth rotation element, and the sixth rotation element, respectively,
   the third planetary gear set is a single pinion planetary gear set having a third sun gear, a third planet carrier, and a third ring gear as the seventh rotation element, the eighth rotation element, and the ninth rotation element, respectively.

6. The planetary gear train apparatus of claim 5, further including:
   five clutches each selectively connecting a corresponding pair among the input shaft, the output shaft, and the first to ninth rotation elements; and
   a brake selectively connecting the ninth rotation element to the transmission housing.

7. The planetary gear train apparatus of claim 6, wherein the five clutches comprise:
wherein the five clutches comprise:
a first clutch mounted between the input shaft and the first rotation element;
a second clutch mounted between the input shaft and the fifth rotation element;
a third clutch mounted between the fifth rotation element and the eighth rotation element;
a fourth clutch mounted between the first rotation element and the second rotation element; and
a fifth clutch mounted between the fifth rotation element and the ninth rotation element,
wherein the brake is mounted between the ninth rotation element and the transmission housing.

* * * * *